United States Patent
Anandadoss et al.

(10) Patent No.: US 10,171,657 B1
(45) Date of Patent: Jan. 1, 2019

(54) SYSTEM AND METHOD FOR OMNI-CHANNEL NOTIFICATION AND SELECTION

(71) Applicant: GENESYS TELECOMMUNICATIONS LABORATORIES, INC., Daly City, CA (US)

(72) Inventors: Praveen Kumar Anandadoss, Chennai (IN); Rajeshkumar Subramanian, Chennai (IN); Venkatesh Sivakumar, Chennai (IN)

(*) Notice: Subject to any disclaimer, the term of this patent is extended or adjusted under 35 U.S.C. 154(b) by 0 days.

(21) Appl. No.: 16/028,972

(22) Filed: Jul. 6, 2018

(51) Int. Cl.
 H04M 1/725 (2006.01)
 H04M 3/523 (2006.01)
 H04M 3/51 (2006.01)
 H04L 29/06 (2006.01)

(52) U.S. Cl.
 CPC ..... H04M 3/5141 (2013.01); H04M 1/72525 (2013.01); H04M 1/72561 (2013.01); H04M 3/5166 (2013.01); H04M 3/5191 (2013.01); H04M 3/5238 (2013.01); H04L 65/1006 (2013.01)

(58) Field of Classification Search
 CPC ............ H04M 3/5191; H04M 3/5238; H04M 3/5166; H04M 3/5183; H04L 65/1006
 USPC ......... 379/265.09, 242, 266.01, 265.05, 264, 379/271, 273, 272, 88.01, 266.06, 266.08
 See application file for complete search history.

(56) References Cited

U.S. PATENT DOCUMENTS

| | | | |
|---|---|---|---|
| 8,767,948 | B1 | 7/2014 | Riahi et al. |
| 8,942,684 | B2 * | 1/2015 | Calman ............... H04L 12/1818 455/416 |
| 9,008,283 | B2 | 4/2015 | Riahi et al. |
| 9,159,037 | B2 | 10/2015 | Mezhibovsky et al. |
| 9,386,152 | B2 | 7/2016 | Riahi et al. |
| 9,578,071 | B2 | 2/2017 | Mezhibovsky et al. |
| 9,648,167 | B2 | 5/2017 | Riahi et al. |
| 9,654,637 | B2 | 5/2017 | Ristock et al. |
| 9,762,733 | B1 | 9/2017 | Ramanujaiaha et al. |
| 9,900,437 | B2 | 2/2018 | Ristock et al. |
| 9,934,491 | B2 | 4/2018 | Mezhibovsky et al. |
| 2015/0189085 | A1 | 7/2015 | Riahi et al. |

* cited by examiner

*Primary Examiner* — Thjuan K Addy

(57) ABSTRACT

A system and method are presented for omni-channel notification and selection. A first party selects a first channel from a plurality of channels based on an estimated wait time for interaction with another party in a contact center or enterprise setting. The plurality of channels may comprise any means of interaction, such as chat, phone call, SMS, video, etc. While waiting in queue for the preferred first channel, the first party is presented with estimated wait times, which are dynamically updated, for other channels. Based on the first party's preferences and the presented estimated wait times for the other channels, the first party may elect to change interaction channels from the first channel to a second channel. The first party may then be moved to a different queue corresponding to the second interaction channel.

22 Claims, 6 Drawing Sheets

SYSTEM AND METHOD FOR OMNI-CHANNEL NOTIFICATION AND SELECTION

BACKGROUND

The present invention generally relates to telecommunications systems and methods, as well as interaction routing within. More particularly, the present invention pertains to interaction routing between a plurality of channels during an interaction.

SUMMARY

A system and method are presented for omni-channel notification and selection. A first party selects a first channel from a plurality of channels based on an estimated wait time for interaction with another party in a contact center or enterprise setting. The plurality of channels may comprise any means of interaction, such as chat, phone call, SMS, video, etc. While waiting in queue for the preferred first channel, the first party is presented with estimated wait times, which are dynamically updated, for other channels. Based on the first party's preferences and the presented estimated wait times for the other channels, the first party may elect to change interaction channels from the first channel to a second channel. The first party may then be moved to a different queue corresponding to the second interaction channel.

In one embodiment, a method is presented for facilitating a change from a first communication channel to a second communication channel for an interaction within a contact center system for a first party after the interaction has been initiated and the first party is in queue for the first communication channel, comprising: providing, through a user interface associated with a mobile application interoperably connected to the contact center system, the first party with estimated queue wait times for a plurality of communication channels associated with the contact center system; initiating an interaction through receiving a selection from the first party for the first communication channel from the plurality of communication channels; processing the first selection of the first communication channel by a SIP server and a voice platform, wherein the voice platform provides a standards-based VoiceXML platform that provides a speech application, and routing the interaction into a queue associated with the first communication channel; informing, by the speech application, the first party of estimated queue wait times associated with each of the plurality of communication channels; providing, by the voice platform, the first party with the capability to switch channels through selection of a prompt associated with each of the plurality of communication channels; receiving a selection from the first party of the second communication channel; and transferring, via a switch channel API, the interaction from the queue associated with the communication channel to a queue associated with the second communication channel.

In another embodiment, a method is presented for facilitating a change from a first communication channel to a second communication channel for an interaction within a contact center system for a first party after the interaction has been initiated and the first party is in queue for the first communication channel, comprising: providing, through a user interface associated with a web browser interoperably connected to the contact center system, the first party with estimated queue wait times for a plurality of communication channels associated with the contact center system; initiating an interaction through receiving a selection from the first party for, the first communication channel from the plurality of communication channels; processing the first selection of the first communication channel by a SIP server and a voice platform, wherein the voice platform provides a standards-based VoiceXML platform that provides a speech application, and routing the interaction into a queue associated with the first communication channel; informing, by the speech application, the first party of estimated queue wait times associated with each of the plurality of communication channels; providing, by the voice platform, the first party with the capability to switch channels through selection of a prompt associated with each of the plurality of communication channels; receiving a selection from the first party of the second communication channel; and transferring, via a switch channel API, the interaction from the queue associated with the communication channel to a queue associated with the second communication channel.

In another embodiment, a method is presented for facilitating a change from a first communication channel to a second communication channel for an interaction within a contact center system for a first party after the interaction has been initiated and the first party is in queue for the first communication channel, comprising: providing, through a user interface, the first party with estimated queue wait times for a plurality of communication channels associated with the contact center system; initiating an interaction through receiving a selection from the first party of the first communication channel from the plurality of communication channels; processing the first selection by a service associated with the first communication channel, and routing the interaction into a queue associated with the first communication channel; informing, through the user interface, the first party of estimated queue wait times associated with each of the plurality of communication channels; providing, through the user interface, the first party with the capability to switch channels through selection of a prompt associated with each of the plurality of communication channels; receiving a selection from the first party of the second communication channel; transferring, via a switch channel API, the interaction from the queue associated with the first communication channel to a queue associated with the second communication channel.

DETAILED DESCRIPTION

Figure 1:
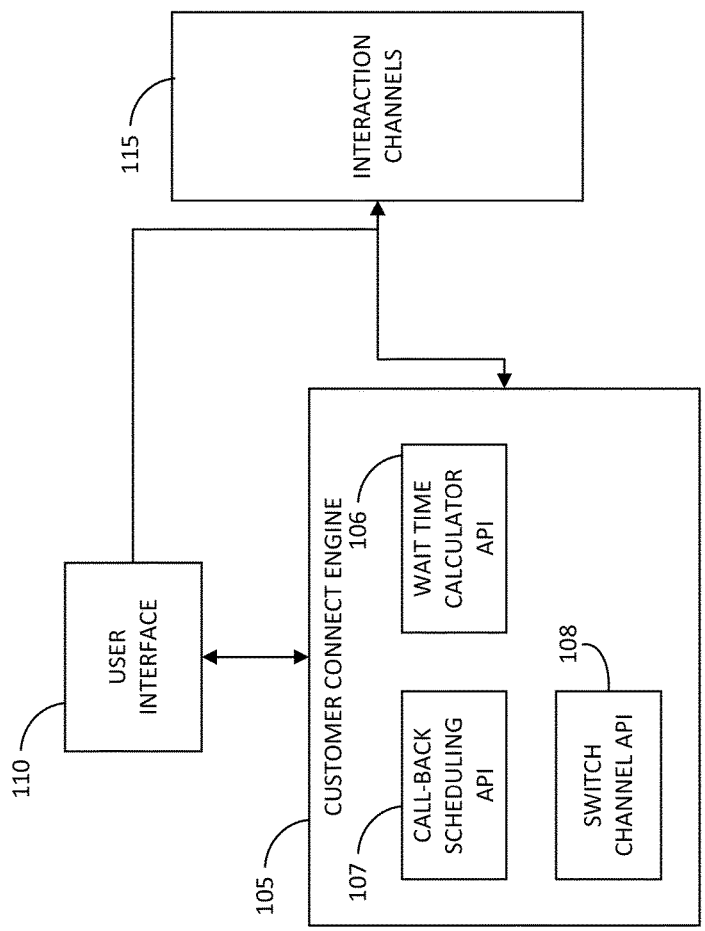
FIG. 1 is a diagram illustrating an embodiment of the architecture of the system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Contact centers have multiple channels through which interactions may occur. When a customer interacts with an agent, for example, the customer may initially select their preferred channel of communication, such as video, SMS, email, voice, chat, social channels, mobile applications, etc. The selection is often made without having enough information to select which channel will be the most efficient for the customer's interaction. The customer might have been provided with an estimated wait time for a channel at the outset of the interaction. For example, the customer might be browsing their banking application on their mobile device. The customer might see that there is currently a three-minute wait to speak with an agent if they initiate an interaction via phone call, but there is no information about the other channels, such as chat, SMS, or video available to them for connection with an agent. The customer cannot see if a chat might be a faster way to reach an agent or an email might receive a faster response than waiting for the next available agent via phone.

In another embodiment, information about the estimated wait time of a plurality of different channels is not provided dynamically to encourage a customer to switch between channels based on wait time, particularly after the customer may have initiated an interaction with a first channel. Existing solutions are limited in that they may only provide information regarding estimated wait time for the first channel once the customer has chosen it and entered the queue for that channel. Further, information is limited in that it does not provide any prior information or notification about the estimated wait time of different channels of the available plurality of channels for the contact center environment before the customer selects a specific channel in an omni-channel solution. Information is also limited in that it does not provide information or notification of estimated wait times for different channels after the customer selects a specific channel and enters the queue for that channel. A customer thus does not have an opportunity to switch queues if a more efficient option becomes available while they are waiting in queue for the selected channel. Facilitating the ability to switch channels once in queue allows busy channels within the contact center to be unloaded thus facilitating workload distribution and decreasing overall customer wait time while increasing agent productivity across the contact center.

In an embodiment, customers (or users) may be automatically informed or notified about estimated wait times for a plurality of channels via a mobile application or a web browser. The mobile application may be downloaded to the customer's mobile device (e.g., smartphone or tablet). The web browser user interface (UI) may be accessed through the user's mobile device or computing device. Information about the estimated wait times for the plurality of channels may be dynamically accessed and updated even if the customer is already in queue for a particular channel. For example, the customer may be running their web browser on their smartphone or on their computing device while waiting on hold with a voice call. The customer may find that chat has a shorter wait time and elects to transition over to the chat channel from the voice channel. Once the customer has initiated the transition, the customer may receive a notification (such as a screen pop or SMS) with a link to initiate a chat session using their web browser in the mobile device. While transitioning out of voice and into chat, with a web browser, the chat session may be initiated in a separate browser window. In the event that the customer is performing the switch entirely within their mobile application, the chat session may resume inside the mobile application itself with the initial voice call being disconnected.

FIG. 1 is a diagram illustrating an embodiment of the architecture of the system, indicated generally at 100. Components of the system may include: a Customer Connect Engine 105 comprising a Wait Time Calculator API 106, a Call-back Scheduling API 107, and a Switch Channel API 108; a User Interface 110; and Interaction Channels 115. The Customer Connect Engine 105 comprises a server component which allows the user to choose different Interaction Channels 115 and schedule a callback based on the dynamically updated estimated wait time. The Customer Connect Engine 105 receives input from a user, such as the customer, via a User Interface 110. Upon receiving a request for channel selection and/or call-back scheduling from a user via the User Interface 110, the Customer Connect Engine 105 forwards the request to one of the corresponding APIs, of which it is comprised at the backend of the application. The APIs comprise a Wait Time Calculator API 106, a Call-back Scheduling API 107, and a Switch Channel API 108. The User Interface 110 may be present in a web browser on a computing device or a mobile device. The User Interface 110 may also be present in a mobile application on a user's mobile device (such as a tablet or a smart phone). Using the input from the user, the Customer Connect Engine 105 performs specific functions of routing an interaction from the customer towards the Interaction Channel 115 of their choice. The Customer Connect Engine 105 may also calculate the estimated waiting time of each of the plurality of Interaction Channels 115. Calculations may be performed when the application is idle or be triggered when an interaction from the customer enters the queue. When a triggering event occurs, calculations are continuously updated in real-time or at specific time-periods, such as refreshed every minute, for example.

The User Interface 110 may be accessed by a user through a mobile device using the mobile application or via a web browser on a computing device having access to the world wide web. The User Interface 110 may be updated with estimated waiting times dynamically from the Customer Connect Engine 105. The Customer Connect Engine 105 also provides capabilities for the customer to schedule a call-back from the Interaction Channel 115 of their choice.

The Wait Time Calculator API 106 retrieves appropriate queue waiting lists from each of the plurality of different Interaction Channels 115 utilizing a stat server. This information is provided to the User Interface 110. Once the estimated waiting time is received, the User Interface 110 is refreshed automatically in real-time.

The Call-back Scheduling API 107 schedules call-backs for a customer when the customer elects to schedule a call-back from the Interaction Channel 115 of their choice. The customer can specify the order of their channel priority from the plurality of channels available and provide the API with the time of their choice through the User Interface 105. Once this information is received by the Call-back Scheduling API 107, the API will automatically search for the interaction channel with the least waiting time. A call-back may be triggered directly to the customer based on the submitted preferences.

The Switch Channel API 108 enables the customer to switch from one waiting queue of a channel to the waiting queue of another channel. For example, if the customer is already in queue for a phone call, and the customer discovers the waiting time of the chat channel is lower than that for the phone call, the customer can utilize a "channel switch" button from the User Interface 105 to tell the Switch Channel API 108 to change Interaction Channels 115.

The User Interface 110 accesses the contact center through a plurality of Interaction Channels 115. The Interaction Channels 115 comprise chat, voice, SMS, video, call-back scheduling, social channels, etc., to name a few non-limiting examples.

Figure 2:
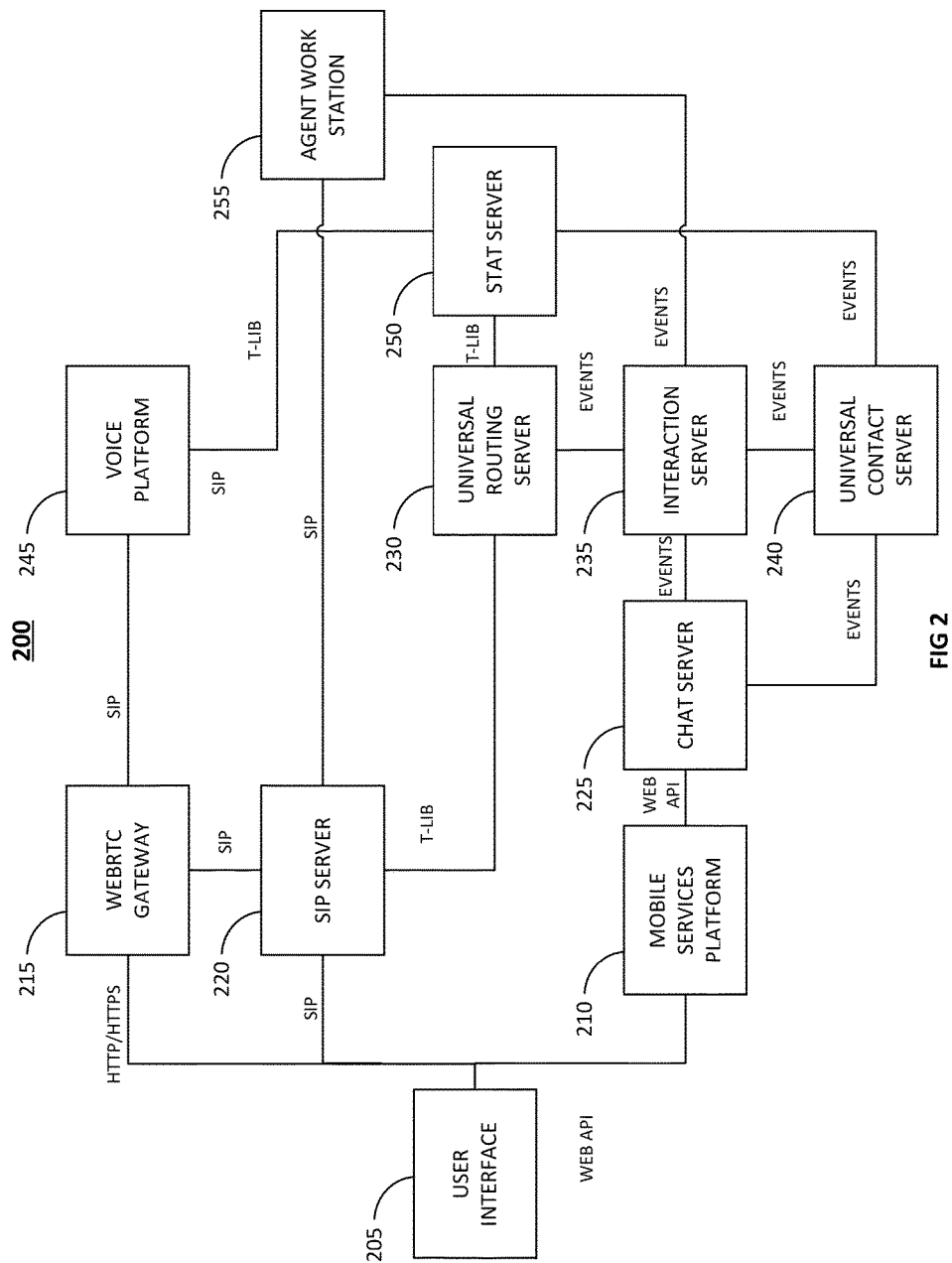
FIG. 2 is a diagram illustrating an embodiment of omni-channel architecture.

FIG. 2 is a diagram illustrating an embodiment of omni-channel architecture, indicated generally at 200. Components of the system may include a: User Interface 205, a Mobile Services platform 210, a WebRTC Gateway 215, a SIP Server 220, a Chat Server 225, a Universal Routing Server 230, an Interaction Server 235, a Universal Contact Server 240, a Voice Platform 245, a Stat Server 250, and an Agent Workstation 255. In an embodiment, the User Interface 205 allows a user to interact with the system application, which in turn interacts with the Mobile Services Platform 210, the SIP Server 220, and the WebRTC Gateway 215. The system application may interact with the Mobile Services Platform 210 via a Web-API. A Web-API makes use of HTTP or HTTPS protocol. The Mobile Services Platform 210 may function as a gateway for multiple other digital communication channels like chat, SMS, email, etc, linking a mobile application with a contact center. Session Initiation Protocol (SIP) may be used by the application to communicate with the SIP Server 220. An HTTP or HTTPS protocol might be used to communicate with the WebRTC Gateway 215. The WebRTC Gateway 215 may connect WebRTC technology (which supports browser-to-browser applications for interactions without the need of internal or external plug-ins) and an established VoIP technology (such as SIP). The WebRTC Gateway is able to communicate with the SIP Server 220 via SIP and with the Voice Platform 245 also via SIP. The SIP Server 220 comprises an application which accepts SIP requests and responds. The SIP Server 220 provides an interface between telephony hardware and software components in the system. It may translate and tracks events and requests that come from the UI 205. The SIP Server 220 may comprise a TCP/IP-based server that can also act as a messaging interface between SIP Server clients. The SIP Server 220 is connected to the WebRTC Gateway 215, the system application, and the Agent Workstation 255 via SIP. The Mobile Services Platform 210 may be connected with the Chat Server 225 via Web-API. The Chat Server 225 initiates and maintains a chat session in coordination with the other components in the system. The Chat Server 225 comprises an API which distributes received messages (or events) to connected clients, such as the Interaction Server 235 and the Universal Contact Server 240. The Interaction Server 235 comprises an API which is connected by events to the Universal Routing Server 230, the Chat Server 225, the Universal Contact Server 240, and the Agent Workstation 255. The Interaction Server 235 comprises the central interchange for interaction flow and mediates among media servers, routing components, knowledge management, and the interacting endpoints. The Universal Contact Server 240 comprises a server which stores the contents of interactions and information about the contacts who are party to the interactions. The information might include identifying information (e.g., name and address) and the history of all interactions that have involved the contact. The Universal Contact Server 240 is connected by events with the Chat Server 225, the Interaction Server 235, and the Stat Server 250. The Universal Routing Server 230, is connected via a T-Library Protocol ('T-Lib') with the SIP Server 220 and the Stat Server 250, while it is connected via events with the Interaction Server 235. The Universal Routing Server 230 enables distribution of interactions throughout the system based on routing strategies and business processes which route to the most appropriate agent/resource based on a plurality of factors (type of inquiry, value of customer, media channel, etc.) The Stat Server 250 tracks information about customer interaction networks and converts the data accumulated into statistically useful information. These calculations may be passed to other software applications that request the data (such as the Universal Routing Server 230) and is connected with the Universal Routing Server 230 and the Voice Platform 235 via a T-Lib Protocol. The Stat Server 250 is connected to the Universal Contact Server 240 via events. The Voice Platform 235 provides a standards-based VoiceXML platform that provides advanced speech applications such as IVR and is connected via SIP to the WebRTC Gateway 215 and to the Stat Server 250. The Agent Workstation is connected to the SIP Server 220 via SIP and to the Interaction Server via events 235. An Agent Workstation 255 might comprise a computer for each agent, a telephone set/headset connected to a telecom switch and is linked to a computer network for the contact center.

Figure 3:
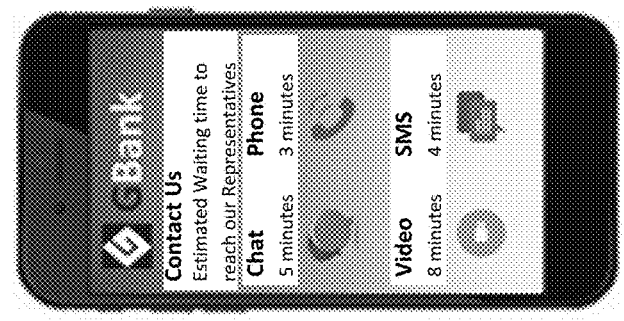
FIG. 3 is a diagram illustrating an embodiment of a mobile application user interface.

FIG. 3 is a diagram illustrating an embodiment of a mobile application user interface, indicated generally at 300. For example, the customer may need to reach out to their bank's customer service center and are currently in the bank's application within their smartphone. The plurality of channels available for contacting the bank are displayed in the user interface along with estimated wait times. Here, the chat channel is showing a 5 minute estimated wait time, the phone channel has a 3 minute estimated wait time, the video channel has an 8 minute estimated wait time, and the SMS channel has a 4 minute estimated wait time. The customer can select which channel best suits their needs from the plurality of options displayed, which in this example, might be the fastest means of communicating with the contact center. The customer would select the phone channel as it has the shortest estimated wait time. The stat server has custom statistical data about the least estimated waiting time specific to the agent grouping associated with an interaction channel based on skillset and the channel and this information is dynamically updated.

Figure 4:
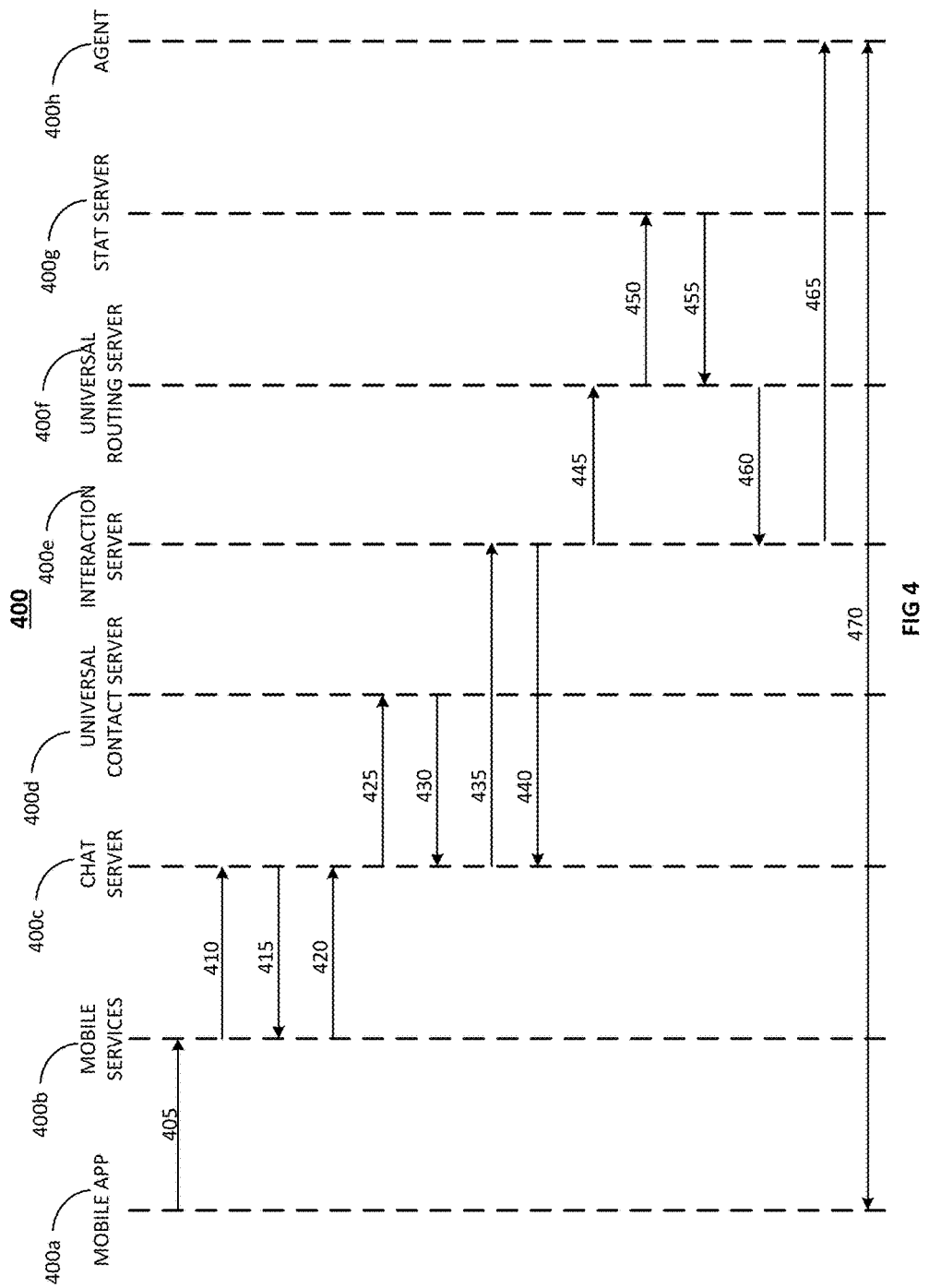
FIG. 4 is a sequence diagram illustrating an embodiment of preferred channel selection.

FIG. 4 is a sequence diagram illustrating an embodiment of preferred channel selection, indicated generally at 400. The flow of the customer's preferred channel selection is displayed in FIG. 4. A customer may have set preferences that they automatically want to reach out to a contact center based on whichever interaction channel has the least wait time. In this instance, FIG. 4 is illustrating the flow for an embodiment of when a customer has chosen chat as the preferred channel for communication. In this example, the customer is using a mobile application on their mobile device to connect with the contact center and the customer is not electing to change channels. Chat has been identified as having the least estimated waiting time and the customer has selected the chat channel for the interaction. When the customer selects the chat channel from the mobile application UI on their device, the mobile application 400*a* sends a WebAPI Request 405 to the Mobile Services Platform 400*b*. The Mobile Services Platform sends a login request 410 to the Chat Server 400*c*, which returns the event status 415 to the Mobile Services Platform 400*b*. A join request 420 is sent to the Chat Server 400*c*. The Chat Server 400*c* sends a creation request 425 to the Universal Contact server 400*d*, which responds with an Interaction ID (IXN ID) 430. The Chat Server 400c then sends an IXN ID submission 435 to the Interaction Server 400e, which acknowledges the event 440. The Interaction Server 400e sends an event routing request 445 to the Universal Routing Server 400f. The Universal Routing Server 400f sends an OpenStat request 450 the Stat Server 400g. The Stat Server 400g opens the stat 455 and sends acknowledgement to the Universal Routing Server 400f. The Universal Routing Server 400f then requests from the Interaction Server 400e that the interaction be routed 460. An event invite 465 is sent from the Interaction Server 400e to the Agent 400h. The agent accepts the invite 470 and is connected with the customer via chat in the mobile application 400a.

Figure 5:
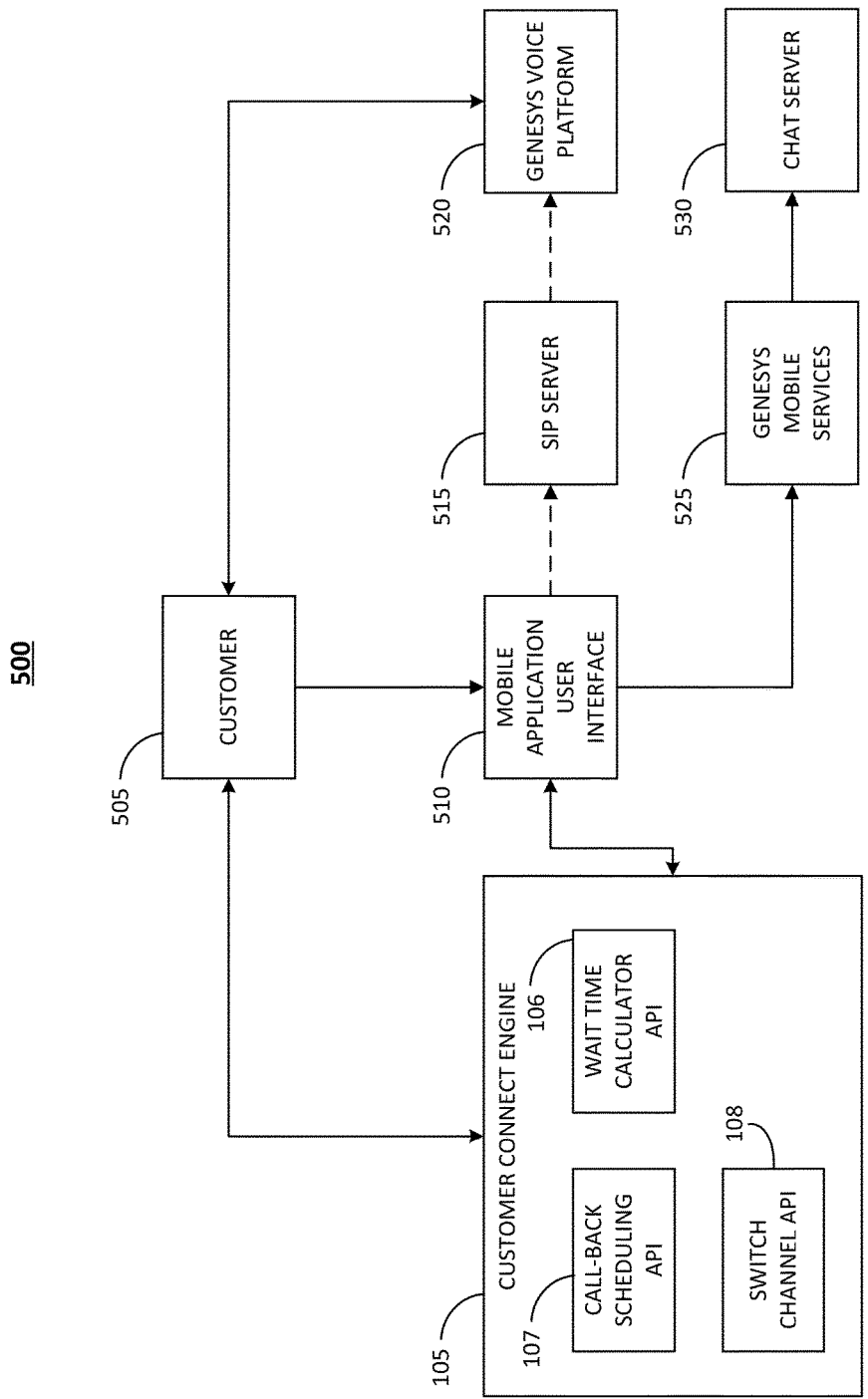
FIG. 5 is a diagram illustrating an embodiment of a user initiating a change in channels.

FIG. 5 is a diagram illustrating an embodiment of a user initiating a change in channels once an interaction has been initiated but the users (an agent and a customer, for example) have not been connected, indicated generally at 500. The customer has indicated their preferred channel for interaction and has been routed to the queue for that channel. For example, when a customer is waiting in a queue, the customer connect engine provides proactive notification via the user interface to the user about estimated queue wait time for different channels. Functionality is also provided within the UI to allow the user to switch between channels should they decide to abandon the current channel for a different channel out of the plurality of channels offered by this particular contact center environment.

In FIG. 5, the Customer 505 has chosen the voice channel as their preferred channel, which has a least estimated waiting time of 7 minutes through the mobile application user interface 510. In an embodiment, the selection could also be made through a web-browser interface on a computing device or a user's mobile device. The request is processed by the SIP Server 515 and the Voice Platform 520. In an embodiment, the Voice Platform 520 may play an IVR prompt to the Customer 505 informing them of estimated waiting times of other channels. For example, "your call will be answered in 7 minutes. Press 1 to continue or press 2 to switch to chat channel, which has a wait time of 2 minutes". The IVR might offer any number of channels the customer could switch to along with estimated wait times of each. Meanwhile, the Wait Time Calculator API 106 in the Customer Connect Engine 105 displays the waiting time of all the channels in the mobile application interface 510 and continues to dynamically update these. The Customer 505 decides to proceed with the chat channel and selects to switch from the voice channel to the chat channel. This request is processed by the Switch Channel API 108. The Switch Channel API 108 transfers the interaction from voice to chat. When a user transitions from channel to channel (using voice transitioning to chat as in the current example), the customer is shown a confirmation screen pop to switch from voice to chat in their UI. Once the customer confirms, the chat session is initiated. If the customer is still in queue for the voice channel, an automated message may be played and the call properly disconnected with the customer being removed from the voice channel queue. The Mobile Services Platform 525 and the Chat server 530 then proceed to handle the interaction.

Figure 6:
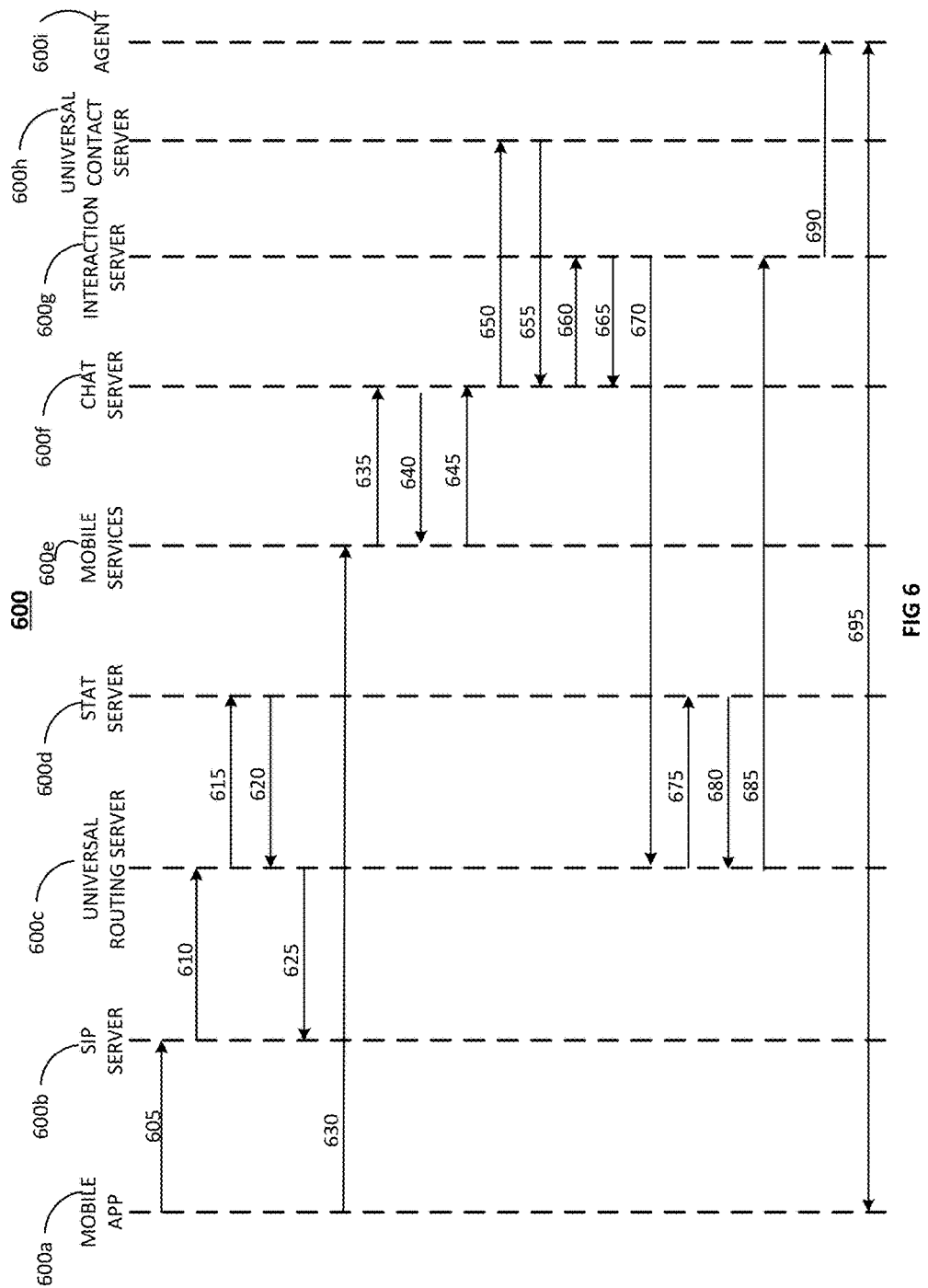
FIG. 6 is a sequence diagram illustrating an embodiment of interaction flow during channel change.

FIG. 6 is a sequence diagram illustrating an embodiment of interaction flow during channel change, indicated generally at 600. Based on the least estimated waiting time, the customer can switch between a plurality of interaction channels any number of times. Since the queue waiting time for each channel is dynamically updated in the background, the Push-In notification through the user interface makes it visible for the customer to make appropriate decisions on changing the mode of interaction. FIG. 6 illustrates an example of the flow of control from the mobile application until the customer is connected to the contact center using any chat channel after it has been identified that the waiting time for the voice channel is considerably higher now that the customer has entered the voice channel queue.

In this example, the Mobile application has identified the voice channel as having the least estimated wait time. The customer has specified to the Mobile Application that they prefer the voice channel. The Mobile Application 600a sends a SIP invite 605 to the SIP Server 600b. The SIP Server 600b sends an invite 610 to the Universal Routing Server 600c. The Universal Routing Server 600c sends an OpenStat request 615 to the Stat Server 600d. The Stat Server may find that no agent is available and provides a stat open acknowledgement 620 to the Universal Routing server 600c which then provides the estimated waiting time 625 to the SIP Server 600b. The customer is waiting in the voice channel queue for the agent, but then receives notification from the Mobile App 600a that other channels might be available with shorter waiting times. For example, the chat channel may now have the least estimated waiting time compared to the voice channel waiting time. The notification may be provided as a screen pop in the UI to the customer where the customer can select a new channel from those offered by the contact center. The customer elects to switch to the chat channel from the voice channel while still waiting in the voice channel queue. The Mobile Application 600a sends a WebAPI request 630 to the Mobile Services Platform 600e. The Mobile Services Platform 600e sends a login request 635 to the Chat Server 600f. The Chat Server 600f returns an event status 640 to the Mobile Services Platform 600e, which then returns a join request 645 to the Chat Server 600f. The Chat Server 600f sends a create request 650 to the Universal Contact Server 600h. The Universal Contact Server 600h responds with the IXN ID 655 to the Chat Server 600f. The Chat Server 600f sends a submission request 660 to the Interaction Server 600g, which acknowledges the event 665 to the Chat Server 660f. The Interaction Server 600g sends an event routing request 670 to the Universal Routing Server 600c. The Universal Routing Server 600c then sends an OpenStat request 675 to the Stat Server 600d. The Stat Server 600d acknowledges the stat has been opened 680. The Universal Routing Server 600c then sends a route request 685 to the Interaction Server 600g. An event invite 690 is sent to the Agent 600i by the Interaction Server 600g. The Agent 600i accepts the chat 695 and the connection is made to the customer with the mobile application 600a.

In an embodiment, the customer is also able to configure the mobile application to schedule a callback from the contact center based on the time of their choice. For example, the customer may be free from 4:00 PM to 4:15 PM today. The customer can configure the mobile application to schedule a callback at 4:00 PM. The application will then search for the channel with the least waiting time at 4:00 PM and trigger the callback to the customer with the corresponding channel.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for facilitating a change from a first communication channel to a second communication channel for an interaction within a contact center system for a first party after the interaction has been initiated and the first party is in queue for the first communication channel, comprising:
   a. providing, through a user interface associated with a mobile application interoperably connected to the contact center system, the first party with estimated queue wait times for a plurality of communication channels associated with the contact center system;
   b. initiating an interaction through receiving a selection from the first party for the first communication channel from the plurality of communication channels;
   c. processing the first selection of the first communication channel by a SIP server and a voice platform, wherein the voice platform provides a standards-based VoiceXML platform that provides a speech application, and routing the interaction into a queue associated with the first communication channel;
   d. informing, by the speech application, the first party of estimated queue wait times associated with each of the plurality of communication channels;
   e. providing, by the voice platform, the first party with the capability to switch channels through selection of a prompt associated with each of the plurality of communication channels;
   f. receiving a selection from the first party of the second communication channel;
   g. transferring, via a switch channel API, the interaction from the queue associated with the communication channel to a queue associated with the second communication channel.

2. The method of claim 1, wherein the first communication channel comprises a voice channel.

3. The method of claim 1, wherein the speech application comprises IVR.

4. The method of claim 1, wherein step (e) further comprises simultaneously updating of estimated queue wait times, by a wait time calculator API, through the user interface of the mobile application for the plurality of communication channels.

5. The method of claim 1, wherein the selection of step (f) is made through the speech application.

6. The method of claim 1, wherein the selection of step (f) is made through the user interface.

7. The method of claim 1, wherein the second communication channel comprises a chat channel.

8. A method for facilitating a change from a first communication channel to a second communication channel for an interaction within a contact center system for a first party after the interaction has been initiated and the first party is in queue for the first communication channel, comprising:
   a. providing, through a user interface associated with a web browser interoperably connected to the contact center system, the first party with estimated queue wait times for a plurality of communication channels associated with the contact center system;
   b. initiating an interaction through receiving a selection from the first party for the first communication channel from the plurality of communication channels;
   c. processing the first selection of the first communication channel by a SIP server and a voice platform, wherein the voice platform provides a standards-based VoiceXML platform that provides a speech application, and routing the interaction into a queue associated with the first communication channel;
   d. informing, by the speech application, the first party of estimated queue wait times associated with each of the plurality of communication channels;
   e. providing, by the voice platform, the first party with the capability to switch channels through selection of a prompt associated with each of the plurality of communication channels;
   f. receiving a selection from the first party of the second communication channel;
   g. transferring, via a switch channel API, the interaction from the queue associated with the communication channel to a queue associated with the second communication channel.

9. The method of claim 8, wherein the first communication channel comprises a voice channel.

10. The method of claim 8, wherein the speech application comprises IVR.

11. The method of claim 8, wherein step (e) further comprises simultaneously updating of estimated queue wait times, by a wait time calculator API, through the user interface of the web browser for the plurality of communication channels.

12. The method of claim 8, wherein the selection of step (f) is made through the speech application.

13. The method of claim 8, wherein the selection of step (f) is made through the user interface.

14. The method of claim 8, wherein the second communication channel comprises a chat channel.

15. A method for facilitating a change from a first communication channel to a second communication channel for an interaction within a contact center system for a first party after the interaction has been initiated and the first party is in queue for the first communication channel, comprising:
   a. providing, through a user interface, the first party with estimated queue wait times for a plurality of communication channels associated with the contact center system;
   b. initiating an interaction through receiving a selection from the first party of the first communication channel from the plurality of communication channels;
   c. processing the first selection by a service associated with the first communication channel, and routing the interaction into a queue associated with the first communication channel;
   d. informing, through the user interface, the first party of estimated queue wait times associated with each of the plurality of communication channels;
   e. providing, through the user interface, the first party with the capability to switch channels through selection of a prompt associated with each of the plurality of communication channels;
   f. receiving a selection from the first party of the second communication channel;
   g. transferring, via a switch channel API, the interaction from the queue associated with the first communication channel to a queue associated with the second communication channel.

16. The method of claim 15, wherein the user interface is interoperably connected to the contact center system through a web-browser.

17. The method of claim 15, wherein the user interface is interoperably connected to the contact center system through a mobile application.

18. The method of claim 17, wherein the processing of step (c) is performed by a mobile services platform.

19. The method of claim 18, wherein the mobile services platform functions as a gateway for communication channels linking a mobile application with the contact center system.

20. The method of claim 15, wherein the first communication channel comprises one of: chat, voice call, video, SMS, social channel, and a call-back request.

21. The method of claim 15, wherein the processing of step (c) is performed by one of: IVR or WebRTC Service.

22. The method of claim 15, wherein the providing of step (e) is performed through a screen pop.

* * * * *